June 9, 1964
F. J. JAYNE ETAL
3,136,914
VEHICLE HEADLAMP AND FILAMENT SHIELD THEREFOR
Filed Feb. 1, 1960
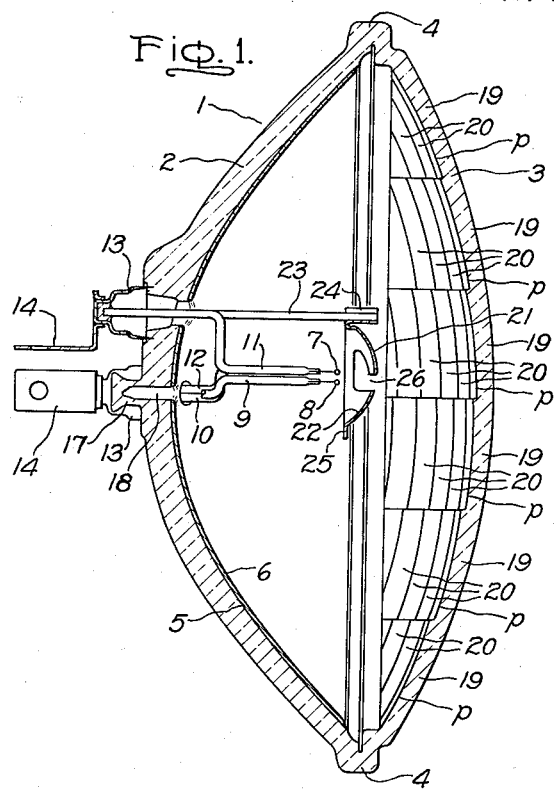
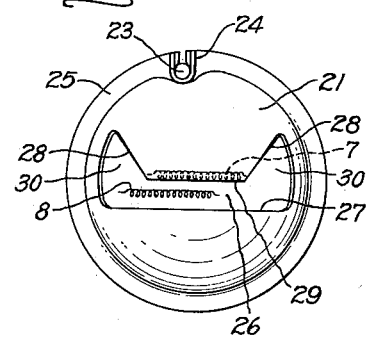
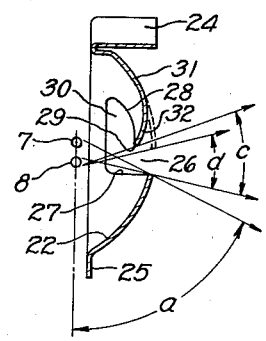
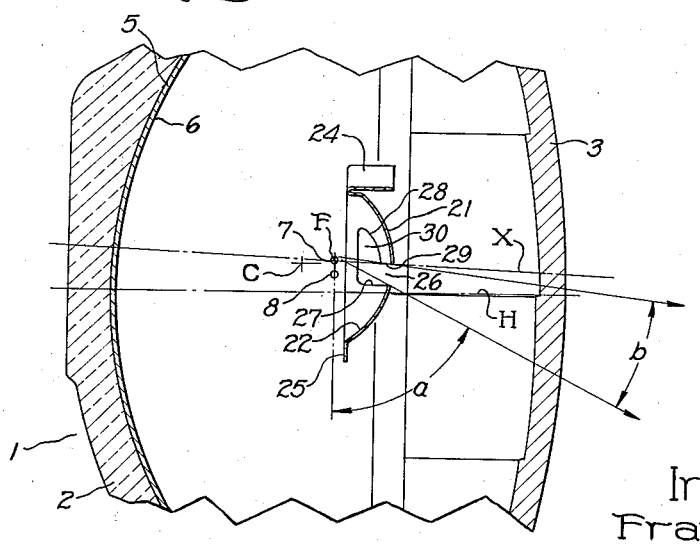
Inventors:
Frank J. Jayne
John E. Foerst
by James J. Lazna
Their Attorney

United States Patent Office 3,136,914
Patented June 9, 1964

3,136,914
VEHICLE HEADLAMP AND FILAMENT SHIELD THEREFOR
Frank J. Jayne and John E. Foerst, Cleveland, Ohio, assignors to General Electric Company, a corporation of New York
Filed Feb. 1, 1960, Ser. No. 5,708
12 Claims. (Cl. 313—117)

Our invention relates in general to vehicle headlamps, and more particularly to vehicle headlamps of the type adapted to produce one or more light beams at least one of which is a depressed beam suitable for use when passing vehicles traveling in the opposite direction.

In the motor vehicle industry, it is the practice to mount the headlamps of the vehicles at mounting heights, above the level of the road, conforming to specifications set therefor by the industry. Recently, such vehicle headlamp mounting height specifications have been revised to permit a lowered mounting of the headlamps on the vehicles. It has been found, however, that such a lowered headlamp mounting on the vehicle introduces in some instances a serious problem of the downward direct light rays from the headlamp filaments striking the adjacent chromium-plated front bumper and bumper guards of the vehicle and being reflected sharply upward therefrom so as to produce an appreciable amount of upward spill light which becomes blinding when reflected to the eyes of the driver by fog, mist, rain or snow. This condition may occur with the depressed or passing light beam as well as with the high or road beam in the case of headlamps provided with two filaments and adapted to produce both types of light beams. The problem, of course, occurs only in those instances where the headlamps are mounted on the vehicle at positions rearwardly of or behind the front bumper.

While the elimination of such upward spill light reflected off the front bumper and bumper guards could be accomplished simply by mounting the vehicle headlamps at positions on the vehicle either ahead of or substantially abreast the front bumper, nevertheless, modern automotive styling trends dictate that some other way be found to accomplish such object, preferably by the construction of the lamp itself, which will still permit the recessed mounting of the vehicle headlamps behind the front bumper. In addition, it is highly desirable that any headlamp constructed to accomplish the above stated object, at the same time still provide a maximum amount of foreground illumination of the roadway in front of the vehicle as well as a maximum amount of lateral illumination to each side of the vehicle and above the horizontal for so-called cornering purposes to enable the driver to see, for example, pedestrians in crosswalks while negotiating turns at street intersections.

It is an object of our invention, therefore, to provide a vehicle headlamp construction which will satisfactorily accomplish the above mentioned purpose of eliminating substantially all upward spill light caused by the reflection of light from the headlamp by adjacent light-reflective parts of the vehicle.

Another object of our invention is to provide a vehicle headlamp construction which will satisfactorily accomplish the above mentioned object of eliminating substantially all upward spill light caused by the reflection of direct light from the headlamps off the adjacent light-reflective parts of the vehicle and which will also afford a maximum amount of foreground illumination of the roadway in front of the vehicle as well as a maximum amount of lateral illumination obliquely to each side and forwardly of the vehicle to a level above the horizontal.

Still another object of our invention is to provide a vehicle headlamp construction which can be mounted on the vehicle at the lowest mounting height presently permitted by the motor vehicle industry specifications therefor without producing any upward spill light caused by the reflection of direct light from the headlamp filament by any light-reflective parts of the vehicle which may be located thereon ahead of the headlight.

Briefly stated, in accordance with one aspect of our invention, a vehicle headlight of the type such as is in general use at present on motor vehicles, and having a coiled filament disposed at or closely adjacent the reflector focus for producing a depressed passing beam from the lamp, is provided with a light-intercepting shield mounted in front of the filament and configurated to intercept not only a preponderate portion of the direct light from the filament which otherwise would pass out the upper half of the lens, but also all the direct light from the filament which otherwise would pass out the lower half of the lens up to a predetermined cut off level and would strike and be reflected by the bumper and other light-reflective parts of the vehicle to produce undesirable upward spill light in front of the vehicle.

In accordance with a further aspect of our invention, the light-intercepting shield is of substantially spherically dished shape and is provided with a narrow slot-shaped aperture extending approximately horizontally across the uppermost region of its lower half in order to permit the passage therethrough of a comparatively narrow band of direct light from the filament, immediately below the horizontal plane thereof, for the purpose of affording foreground illumination of the roadway. The slot-shaped aperture in the shield preferably is vertically widened out at its opposite ends upwardly above the horizontal plane of the filament in order to permit the passage therethrough, for sidewise illumination, above the horizontal, of a limited amount of the forward and upward direct rays from the filament which are directed therefrom laterally to the opposite sides of the headlamp at an appreciable angle to the vertical axial plane thereof.

Further objects and advantages of our invention will appear from the following detailed description of species thereof and from the accompanying drawings.

In the drawings,

FIG. 1 is a vertical axial section of a vehicle headlamp comprising our invention.

FIG. 2 is a front elevation of the light shield and the associated filaments of the headlamp.

FIG. 3 is a diagrammatic illustration of the headlamp comprising our invention, on a vertical axial plane thereof, showing the manner in which certain of the forward direct light rays from the filaments are intercepted by the light shield, and FIG. 4 is a side elevation of a modified form of light shield according to the invention shown in its mounted position within the headlamp relative to the filaments thereof.

Referring to FIG. 1, the invention is there shown as applied to a vehicle headlamp in the form of a self-contained incandescent lamp of the sealed beam type such as described and claimed in United States Patent No. 2,148,314, issued February 21, 1939, to D. K. Wright. The lamp comprises a sealed bulb or envelope 1 consisting of a pressed glass reflector section 2 and a cover glass or light-modifying lens section 3 sealed together at their peripheries by fusion, as indicated at 4. The inner surface 5 of the reflector section 2 is shaped to conform approximately to a paraboloid which, in accordance with the invention, is formed with its axis X (FIG. 3) tilted or offset slightly downward and forwardly of the lamp, relative to the horizontal axis H of the lamp envelope 1, at an angle of from one to a few degrees, for example, one to four degrees, and preferably of the order of three and one-half degrees. In addition, the reflector axis X may be horizontally canted or directed to one side of the vertical plane of the lamp, for example, to the right of the said plane as viewed from the rear of the lamp, at a small angle ranging from approximately one to four degrees, and preferably of the order of 1½ degrees. The inner surface 5 of the reflector 2 is provided with a coating 6 of suitable light reflecting material, such as aluminum or silver, to thereby form a reflecting surface.

One or more concentrated light sources or filaments are mounted in the lamp envelope 1 in definite optical relation to the reflecting surface 6 thereof. In the particular case illustrated, the invention is shown as embodied in a vehicle headlamp of the conventional two-filament type provided with two separate filaments, i.e. an upper filament 7 and a lower filament 8, for selectively producing either a depressed or lower passing beam for use when passing vehicles traveling in the opposite direction, or an upper driving beam for use in open country when no vehicles are approaching in the opposite direction. It should be understood, however, that the invention is applicable as well to single filament headlamps for producing only one light beam such as, for instance, a depressed passing beam.

In the particular two-filament headlamp illustrated, each of the two filaments 7 and 8 comprises a linear coil of a suitable refractory metal such as tungsten, and they are spaced one above the other in the envelope 1 in horizontally-extending parallel relation transversely of the reflector axis X with the upper filament 7 located approximately at the focal point F (FIG. 3) of the reflecting surface 6, i.e., either symmetrically at the focal point F or offset a slight distance of, for example, 0.090 inch or so to the right of the focal point F as viewed from the front of the lamp, and the lower filament 8 located a slight distance of, for example, 0.085 inch, on centers, below the upper filament 7 and approximately in the focal plane of the reflecting surface 6, and offset a slight distance of, for example, 0.090 inch, on centers, to the left of the upper filament 7, as viewed from the front of the lamp. The filaments 7 and 8 are electrically connected to, and are supported in place within the lamp envelope 1 by respective pairs of rigid lead-in conductors or wires 9, 10 and 11, 12 which extend through openings in the wall of the reflector section 2 at the rear thereof and are secured at their outermost ends, as by brazing for instance, to respective metal thimbles or ferrules 13 having feathered edges embedded in and fusion-sealed to the exterior of the reflector section 2 around the said openings. Metal contact or terminal lugs 13 are suitably secured, as by brazing, to the closed ends of the thimbles 13 for connecting the lamp to a suitable source of current supply. The lamp envelope 1 is exhausted and, if desired, filled with a suitable inert gas such as argon, nitrogen or mixtures thereof, through an exhaust tubulation 17 communicating with the interior of the envelope through an exhaust aperture 18 in the envelope wall at the apex of the reflector section 2. After exhaustion of the lamp envelope through the tubulation 17 and, if desired, introduction of the gas filling thereinto, the tubulation 17 is sealed or tipped-off to hermetically seal the lamp envelope.

The light-modifying lens 3 of the headlamp is provided with suitable light-refracting media, preferably on the inner side of the lens, for refracting the rays of light from the reflecting surface 6 so as to produce, upon selective energization of the filaments 7 and 8, a depressed or lower passing beam and an upper or driving beam, respectively, conforming to the specifications set therefor by the motor vehicle industry. For this purpose, the lens 3 is preferably divided into a series of horizontally extending sections 19 each of which is provided, across the full width thereof, with a plurality of small (approximately ¼" wide) vertically extending light-spreading flutes 20, preferably disposed in side-by-side relation on the rear or inside surface of the lens as shown in FIG. 1, for horizontally spreading the light passing through the flutes. Certain of the flutes 20 in each section 19 are of different degrees of spread in order to impart the required horizontal spread to the light beams projected by the lamp. In addition, certain portions of each of the lens sections 19 may be formed with either upwardly or downwardly light-bending prisms $p$, and with left or right bending prisms in addition (not shown), to provide the required vertical and horizontal distribution of the light in the beams projected by the lamp. Preferably, however, in order to minimize the amount of upward spill light which would be produced by the draft surfaces of down-bending prisms on the lens 3, the portion of the total surface area of the lens 3 provided with such down-bending prisms is kept as low as possible, e.g., around 25% or less, the greater proportion of the lens surface area instead being provided with up-bending prisms $p$. In the case of the particular two-filament headlamp illustrated, which in one of its selective modes of operation is adapted to be used for the production of the depressed beam in a conventional 4-headlamp system such as is in general use at present on motor vehicles, the lens 3 is almost entirely devoid of any down-bending prisms. As a result, the headlamp is characterized by a negligible amount of upward spill light from prism draft surfaces on the lens 3.

In accordance with the invention, the headlamp is provided with a light-intercepting shield 21 which is mounted in front of the filaments 7 and 8 and is configurated to not only intercept a preponderate portion of the upward and forward direct rays from the upper filament 7 which would otherwise pass out the upper half of the lens 3 and produce a considerable amount of undesired upward spill light from the lamp, directly forward of the vehicle, but to also intercept all the downward and forward direct rays from the upper filament 7 which would otherwise pass out the lower half of the lens up to a predetermined appreciable cut-off angle $a$ (FIG. 3) from the vertical and which might be apt to strike the bumper or other light-reflective parts of the vehicle and be reflected thereby in a direction forwardly and steeply upward to form highly objectionable upward spill light in front of the vehicle. In addition, the light-intercepting shield 21 is further configurated to allow the passage therethrough of at least a narrow horizontal band of downward direct light from the upper filament, just below the horizontal plane thereof, for the purpose of affording foreground illumination of the roadway in front of the vehicle, and to also permit the passage through the shield of a limited amount of the forward and upward direct rays from the upper filament which are directed therefrom laterally to the opposite sides of the headlamp at an appreciable angle to the vertical axial plane thereof, for the purpose of affording a limited amount of so-called cornering light for the illumination of pedestrians or other objects to the side of the vehicle, as when negotiating turns.

The shield 21 comprises a circular member, preferably in the form of a thin sheet metal stamping, which is mounted in the lamp envelope 1 in a position centered in front of the upper filament 7 at a slight distance therefrom, with its back or inner side 22 preferably of low light-reflective character. In its preferred form, the shield 21 is formed of slightly dished or spherical shape, and it is mounted in the lamp envelope with its concave inner side 22 facing inwardly of the lamp toward the filaments 7 and 8 and with its center of spherical curvature C (FIG. 3) preferably located approximately in the horizontal plane of the underside of the filament 7 and slightly rearwardly thereof. The shield 21 may be conveniently formed of thin, cold-rolled steel having a thickness of around .015 to .017 inch, for example.

As shown in FIG. 1, the shield 21 is preferably supported in place in the lamp envelope 1 by being clamped or otherwise secured to a rigid support wire 23 extending from and suitably secured, as by brazing, to one of the metal thimbles 13 of the lamp. To this end, the shield 21 is provided with a U-shaped clamping lug 24 which is formed integrally with the shield at its lip-shaped rim 25 and within which the support wire 23 is received and secured as by clamping the lug 24 around the said support wire. As shown, the clamping lug 24 is struck up from the rim or annular lip 25 of the shield 21 at its top side, and it extends therefrom in a direction forwardly of the lamp, i.e., approximately perpendicular to the plane of the shield rim 25 and upstanding from the convex outer side of the shield so as to be effectively hidden from the upper filament 7 by the shield itself, thereby avoiding reflections of direct rays from the filament 7 off the clamping lug such as might produce uncontrolled upward spill light from the headlamp.

For the purpose of the invention, the shield 21 is preferably made large enough in diameter for its upper half section to intercept, at the particular distance the shield is mounted in front of the filament 7, the greater or preponderate part of the forward and upward direct rays in the upper half-cone of light from the said filament which would otherwise pass out the upper half of the lens 3. As a result, the shield 21 effectively eliminates the major portion of upward spill light from the headlamp itself which otherwise would cause a blinding glare or halo of light in front of the vehicle when reflected to the eyes of the driver by fog or mist particles, or by rain, snow or dust. In the same manner, the lower half of the shield 21 operates to intercept forward and downward direct rays from the filament 7 so as to insure against their striking the highly polished bumper or other light-reflective parts of the vehicle and being reflected thereby forwardly and steeply upward in front of the vehicle to form undesirable upward spill light such as would likewise create a blinding glare or halo of light in front of the vehicle when driving in fog, mist, rain or snow and the like.

In accordance with the invention, however, not all of the forward and downward direct rays of light from the upper filament 7 which would pass out the lower half of the lens 3 are so intercepted by the shield 21. Instead, only the portion of such forward and downward direct light from the filament 7 up to and included within the aforementioned predetermined cut-off angle $a$, which light normally would be apt to strike the bumper and other light-reflective parts of the vehicle, is actually intercepted by the lower part of the shield 21, the remaining portion of such forward and downward direct light above the said cut-off angle $a$ being allowed to pass through the shield to provide a relatively narrow horizontally extending band of forward and downward rays, immediately below and adjacent the horizontal plane of the filament 7, for the purpose of affording foreground illumination of the roadway. To this end, the shield 21 is provided with a generally slot-shaped aperture 26 extending approximately horizontally across the uppermost region of its lower half, i.e., immediately adjacent and to the lower side of the horizontal diameter of the shield, to permit the passage therethrough of the said narrow band of light $b$ (FIG. 3) from the upper filament 7 for foreground illumination of the roadway. The lower or light cut-off edge 27 of the aperture 26 preferably extends approximately horizontally, and it is located at a predetermined level relative to the filament 7 such that the light cut-off angle $a$ (FIG. 3) of the lower part of the shield, up from the vertical plane through the filament 7, is sufficient to insure against any of the forward and downward direct rays from the filament 7 forestriking the bumper or other light-reflective parts of the particular vehicle on which the lamp is to be mounted. For the purposes of the invention, we have found that, for most cases, a cut-off angle $a$, for the lower edge 27 of the aperture 26, ranging from around 30° up to around 70° from the vertical plane through the filament 7 will be effective to accomplish the required interception of the forward and downward direct rays from the filament 7 which would otherwise strike the bumper and other light-reflective parts of the vehicle.

As particularly shown in FIG. 2, the slot-shaped aperture 26 is vertically widened out at its opposite ends upwardly above the horizontal plane of the filament 7 in order to permit the passage therethrough, for sidewise illumination above the horizontal, of a limited amount of the forward and upward direct rays from the filament 7 which are directed therefrom laterally to the opposite sides of the headlamp at an appreciable angle to the vertical axial plane thereof. To this end, the opposite end portions 28 of the upper edge 29 of the slot-shaped aperture 26 in the shield 21 are flared upwardly and outwardly from the substantially horizontally extending center portion of the upper edge 29 which lies approximately in the horizontal plane of the lower side of the filament 7 and is substantially coextensive therewith. The direct light rays from the filament 7 which pass out through the thus formed upwardly widened end portions 30 of the aperture 26 in shield 21 thus afford a limited amount of so-called cornering light for the effective illumination of pedestrians or other objects at the opposite sides of and forwardly of the vehicle, as when negotiating turns for instance.

It will be apparent that because the slot-shaped aperture 26 is located immediately adjacent and to the lower side of the horizontal diameter of the shield 21, the center portion of the upper edge 29 of the aperture 26 therefore approximately coincides with the horizontal diameter of the shield. Also, since the mounting lug 24 is located at the top side of the shield 21, it is therefore located on the shield rim 25 at a point to the upper side of the horizontal diameter of the shield and opposite the mid-region of such diameter.

The modified form of shield 31 shown in FIG. 4 differs from that shown in FIGS. 1–3 in that the tongue-shaped upper portion 32 thereof, extending down between the upwardly widened end portions 30 of the aperture 26, is curled or bent at its lower extremity a slight distance, e.g., around 1/8″ or so, inwardly of the shield toward the upper filament 7 in order to thereby widen the gap or increase the actual distance between the top and bottom edges 29 and 27, respectively, of the aperture 26. As a result, a somewhat greater vertical spread, and therefore higher projected angle $c$ of direct light from the lower or driving beam filament 8, as compared to the angle $d$ of light in the case of the form of shield 21 shown in FIGS. 1–3, is permitted to pass through the shield for the illumination of objects above the level of and near the vehicle, such as low-hanging tree branches or an abrupt rise in the roadway as the vehicle descends and nears the bottom of a steep hill.

What we claim as new and desire to secure by Letters Patent of the United States are:

1. In combination with a vehicle headlamp comprising a concave reflector adapted for mounting on the vehicle with the reflector facing horizontally, a light-modifying lens covering the mouth of said reflector, and a concentrated light source disposed adjacent the focus of said reflector, an approximately circular shaped light-intercepting shield mounted centrally in front of and closely adjacent said light source to intercept direct rays therefrom, said shield having a generally slot-shaped aperture therein extending approximately horizontally across the uppermost region of its lower half to permit passage therethrough of a limited amount of the forward and downward direct light from the light source for foreground illumination, the portion of the shield below the said aperture intercepting all the forward and downward direct rays from the light source which otherwise would pass out the lowermost region of the lens up to a predetermined appreciable angle from the vertical, and the portion of the shield above the said aperture intercepting at least all that portion of the forward and upward direct rays from the light source included in the solid angle subtended by the upper half of the lens other than at the opposite sides thereof.

2. A vehicle headlamp as specified in claim 1 wherein the said shield is of shallow dished shape and is mounted with its dished side facing the said light source.

3. In combination with a vehicle headlamp comprising a concave reflector adapted for mounting on the vehicle with the reflector facing horizontally, a light-modifying lens covering the mouth of said reflector, and a linear coil filament disposed horizontally and adjacent the focus of said reflector, a circular dished light-intercepting shield mounted centrally in front of and closely adjacent said filament with its dished side facing the filament to intercept direct rays therefrom, said shield having a generally slot-shaped aperture extending approximately horizontally across the uppermost region of its lower half to permit passage therethrough of a limited amount of the forward and downward direct light from the filament for foreground illumination, the portion of the shield below the said aperture intercepting all the forward and downward direct rays from the filament which otherwise would pass out the lowermost region of the lens up to a predetermined appreciable angle from the vertical, and the portion of the shield above the said aperture intercepting at least all that portion of the forward and upward direct rays from the filament included in the solid angle subtended by the upper half of the lens other than at the opposite sides thereof.

4. A vehicle headlamp as specified in claim 3 wherein the said slot-shaped aperture in the said shield is upwardly widened at its opposite ends to permit passage therethrough, for sidewise illumination, of a limited amount of those forward direct rays from the filament which are directed above the horizontal and laterally to the opposite sides of the headlamp at an appreciable angle to the vertical axial plane thereof.

5. In combination with a vehicle headlamp comprising a concave reflector adapted for mounting on the vehicle with the reflector facing horizontally, a light-modifying lens covering the mouth of said reflector, and a linear coil filament located adjacent the focus of and disposed horizontally and transverse to the axis of the said reflector, a circular dished light-intercepting shield mounted centrally in front of and closely adjacent said filament with its dished side facing the filament to intercept direct rays therefrom, said shield having a generally slot-shaped aperture extending approximately horizontally across the uppermost region of its lower half to permit passage therethrough of a limited amount of the forward and downward direct light from the filament for foreground illumination, the portion of the shield below the said aperture intercepting all the forward and downward direct rays from the filament which otherwise would pass out the lowermost region of the lens up to a predetermined appreciable angle from the vertical, and the portion of the shield above the said aperture intercepting at least all that portion of the forward and upward direct rays from the filament included in the solid angle subtended by the upper half of the lens other than at the opposite sides thereof, said shield having the upper edge of the said aperture therein extending substantially horizontally in approximately the horizontal plane of and at least approximately coextensive with said filament and having the said aperture upwardly widened at its opposite ends to provide vertically widened aperture end portions for permitting passage therethrough, for sidewise illumination, of a limited amount of the forward and upward direct rays from the filament which are directed therefrom above the horizontal and laterally to the opposite sides of the headlamp at an appreciable angle to the vertical axial plane thereof.

6. In combination with a vehicle headlamp comprising a concave reflector adapted for mounting on the vehicle with the reflector facing horizontally, a light-modifying lens covering the mouth of said reflector, and a pair of vertically spaced linear coil filaments disposed horizonally and transverse to the axis of said reflector in approximately the focal plane thereof with the upper one of said filaments located approximately at the focus of the reflector, a spherically-dished light-intercepting shield mounted centrally in front of and closely adjacent the said upper filament with its concave side facing the filament to intercept direct rays therefrom, said shield having a generally slot-shaped aperture extending approximately horizontally across the uppermost region of its lower half to permit passage therethrough of a limited amount of the forward and downward direct light from the upper filament for foreground illumination, the portion of the shield below the said aperture intercepting all the forward and downward direct rays from the upper filament which otherwise would pass out the lowermost region of the lens up to a predetermined appreciable angle from the vertical, and the portion of the shield above the said aperture intercepting at least all that portion of the forward and upward direct rays from the upper filament included in the solid angle subtended by the upper half of the lens other than at the opposite sides thereof, said shield having the upper edge of the said aperture therein extending substantially horizontally in approximately the horizontal plane of the underside of and at least approximately coextensive with the said upper filament with its opposite end portions widened upwardly above the said upper filament to provide vertically widened aperture end portions for permitting passage therethrough, for sidewise illumination, of a limited amount of the forward and upward direct rays from the upper filament which are directed therefrom above the horizontal and laterally to the opposite sides of the headlamp at an appreciable angle to the vertical axial plane thereof, the portion of the upper half of said shield between the said widened end portions of the aperture therein being curled inwardly toward the said upper filament to widen the gap between the top and bottom edges of the said aperture so as to permit passage therethrough of an increased vertical angular extent of the forward and upward direct rays from the lower one of said filaments for upward foreground illumination.

7. A shield for mounting in a vehicle headlamp forwardly of a filament for intercepting glare-producing direct radiations therefrom, comprising an approximately circularly-shaped sheet metal member having a narrow slot-shaped aperture extending thereacross immediately adjacent and substantially to one side of a diameter thereof.

8. A shield for mounting in a vehicle headlamp forwardly of a filament for intercepting glare-producing direct radiations therefrom, comprising an approximately circularly-shaped sheet metal member having a narrow slot-shaped aperture extending thereacross immediately adjacent and substantially to one side of a diameter thereof, said aperture being widened at its opposite ends to the other side of said diameter.

9. A shield for mounting in a vehicle headlamp forwardly of a filament for intercepting glare-producing direct radiations therefrom, comprising an approximately circularly-shaped shallow dished sheet metal member having a narrow slot-shaped aperture extending thereacross immediately adjacent and to one side of a diameter thereof, said shield being provided with a mounting lug of U-shaped cross-section struck-up from the rim of the shield and upstanding therefrom at a point located to the other side of said diameter opposite the mid-region thereof.

10. A shield for fixedly mounting in a vehicle headlamp immediately in front of a coiled filament disposed in a substantially horizontal plane therein for intercepting certain glare-producing light rays directed forwardly from said filament above and below said plane, said shield comprising an upper shield section disposable above said horizontal plane to intercept certain glare-producing light rays from said filament directed forwardly therefrom above said horizontal plane, a lower shield section being disposable below said horizontal plane to intercept certain glare-producing light rays from said filament directed forwardly therefrom below said horizontal plane, and means joining said shield sections in vertically spaced relation to define a generally central opening in said shield between said sections to permit passage therethrough of selected direct light rays from said filament.

11. A vehicle headlamp comprising a reflector, a filament mounted in front of said reflector in a substantially horizontal plane, a lens secured to and covering said reflector and provided with vertically up-bending and down-bending prisms and generally centrally located light-spreading flutes for distributing light rays reflected by said reflector upon energization of said filament, a filament shield mounted immediately in front of said filament and comprising an upper shield section disposed substantially entirely above said horizontal plane to intercept certain glare-producing light rays from said filament directed forwardly therefrom above said plane, a lower shield section disposed substantially entirely below said horizontal plane to intercept certain glare-producing light rays from said filament directed forwardly therefrom below said plane, and means joining said shield sections in vertically spaced relation to define a generally central opening in said shield between said sections to permit passage therethrough of selected direct light rays from said filament.

12. The headlamp as defined in claim 11 in which said filament is a lower beam filament, and further comprising a substantially horizontal upper beam filament mounted below said lower beam filament and having a substantial portion thereof opposite said opening in said shield.

References Cited in the file of this patent
UNITED STATES PATENTS

| | | |
|---|---|---|
| 1,262,395 | Shickerling | Apr. 9, 1918 |
| 1,607,515 | Duncan | Nov. 16, 1926 |
| 1,880,893 | Dodge | Oct. 4, 1932 |
| 1,946,587 | Owens | Feb. 13, 1934 |
| 2,327,144 | Stam | Aug. 17, 1943 |
| 2,858,467 | Meese et al. | Oct. 28, 1958 |